(12) United States Patent
Davis et al.

(10) Patent No.: US 7,986,449 B2
(45) Date of Patent: Jul. 26, 2011

(54) INDUCED RESONANCE COMB DRIVE SCANNER

(75) Inventors: Wyatt O. Davis, Bothell, WA (US); Hakan Urey, Istanbul (TR)

(73) Assignee: Microvision, Inc., Redmond, WA (US)

(\*) Notice: Subject to any disclaimer, the term of this patent is extended or adjusted under 35 U.S.C. 154(b) by 602 days.

(21) Appl. No.: 12/122,223

(22) Filed: May 16, 2008

(65) Prior Publication Data

US 2009/0284816 A1    Nov. 19, 2009

(51) Int. Cl.
*G02B 26/08* (2006.01)

(52) U.S. Cl. ............................... 359/224.1

(58) Field of Classification Search ..... 359/223.1–226.1
See application file for complete search history.

(56) References Cited

U.S. PATENT DOCUMENTS

| 7,071,594 | B1 | 7/2006 | Yan et al. | |
| 2004/0141894 | A1* | 7/2004 | Mizuno et al. | 422/201 |

OTHER PUBLICATIONS

Kurth, Steffen et al., "A Novel 24 kHz Resonant Scanner for High Resolution Laser Display", *MOEMS Display and Imaging Systems III, Proceedings of SPIE*, vol. 5721 2005, 23-33.

Yoda, M. et al., "A MEMS 1-D Optical Scanner for Laser Projection Display using Self-Assembled Veritical Combs and Scan-Angle Magnifying Mechanism", *Conference on Solid State Sensors, Actuators and Microsystems* Jun. 5, 2005, 968-971.

Kwon, Sunghoon et al., "Vertical Comb Drive Based 2-D Gimbaled Micromirrors with Large Static Rotation by Backside Island Isolation", *IEEE Journal of Selected Topics in Quantum Electronics*, May-Jun. 2004, vol. 10, Issue 3 May 2004, 498-504.

Microvision, Inc., "International Search Report and Written Opinion", PCT Application No. PCT/US2009/040702, filed Apr. 15, 2009, claims priority to present U.S. Appl. No. 12/122,223, filed Dec. 2, 2009.

\* cited by examiner

*Primary Examiner* — Euncha Cherry
(74) *Attorney, Agent, or Firm* — Kevin D. Wills (57) ABSTRACT

Briefly, in accordance with one or more embodiments, a MEMS based scanning platform is arranged to have increased efficiency by driving a first frame of the scanning platform directly by applying a drive voltage to a set of comb fingers disposed on the first frame to cause the first frame to oscillate via torsional rotation of a first flexure and by driving a second frame of the scanning platform indirectly via mechanical coupling of the second frame with the first frame via a second flexure, wherein damping losses and work capacity are such that the operation of the scanning mirror is more efficient than if the set of comb fingers were disposed on the second frame and directly driven by the drive voltage. The scanning platform may comprise a 1D scanner, a 2D scanner, or a multiple-dimensional scanner.

24 Claims, 11 Drawing Sheets

INDUCED RESONANCE COMB DRIVE SCANNER

BACKGROUND

Existing comb drive biaxial scanners typically operate very close to resonance due to the weaker drive torques and due to the limited scan region where the combs have torque input. This still allows for using these biaxial, biresonant scanners in applications such as imaging and displays. However, it is generally challenging to make the slow scan resonant frequency low enough to permit a scanning pattern that produces all the fast scan lines within one slow scan frame. Instead, a lissajous pattern may be created where several slow scan cycles are utilized to create a single complete frame. However, such an arrangement leads to a motion artifact caused by the user's eye motion enabling the brain to detect an impartial frame pattern. One solution to this problem is to reduce the slow scan resonant frequency. In existing comb drive scanners, both axes may be suspended by torsional flexures. In order to reduce the slower scan resonance, the designer must lengthen the flexures, make the flexures thinner, or increase the mass of the moving frame. Such options may cause the scanner to be susceptible to environmental accelerations. The displacement x under a static acceleration load g is inversely proportional to the square of the resonant frequency $\omega$:

$$x = g/\omega^2$$

Because of the displacement, these accelerations can cause the combs to crash into one another. Such crashing may cause the fingers to stick, thereby preventing motion and/or creating an electrical short that could damage the device when the voltage is applied across the interdigitated comb fingers. Furthermore, the thinner flexure and/or longer flexure arrangements also can cause the combs to crash due to the resulting softness of the scanner motion in the lateral direction. Thus, it may be difficult to make the slow scan torsional flexures stiff enough to resist the lateral motions that lead to comb crashes while simultaneously making them soft enough to achieve a desired lower frequency.

For higher resolution display applications, the high horizontal axis scan angle and scanning frequency may lead to high energy losses through aerodynamic damping. The damping forces and torques may be generated by airflow around the comb fingers and by air drag on the mirror itself. For a resonant system, the amount of energy input to the system should balance the damping energy loss, so stable steady state scanning mirror oscillations may exist when the energy input per cycle equals the energy loss per cycle. The rapid damping increase with scan angle leads to high input energy requirements for comb drive scanning mirror based display systems. As an example, the drive amplitudes estimate for a 10° mirror scan angle (MSA) scanning at 32 kHz for Super Video Graphics Array (SVGA) display resolution is 276 V. Such higher voltage amplitudes may be an impediment to system integration and miniaturization.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
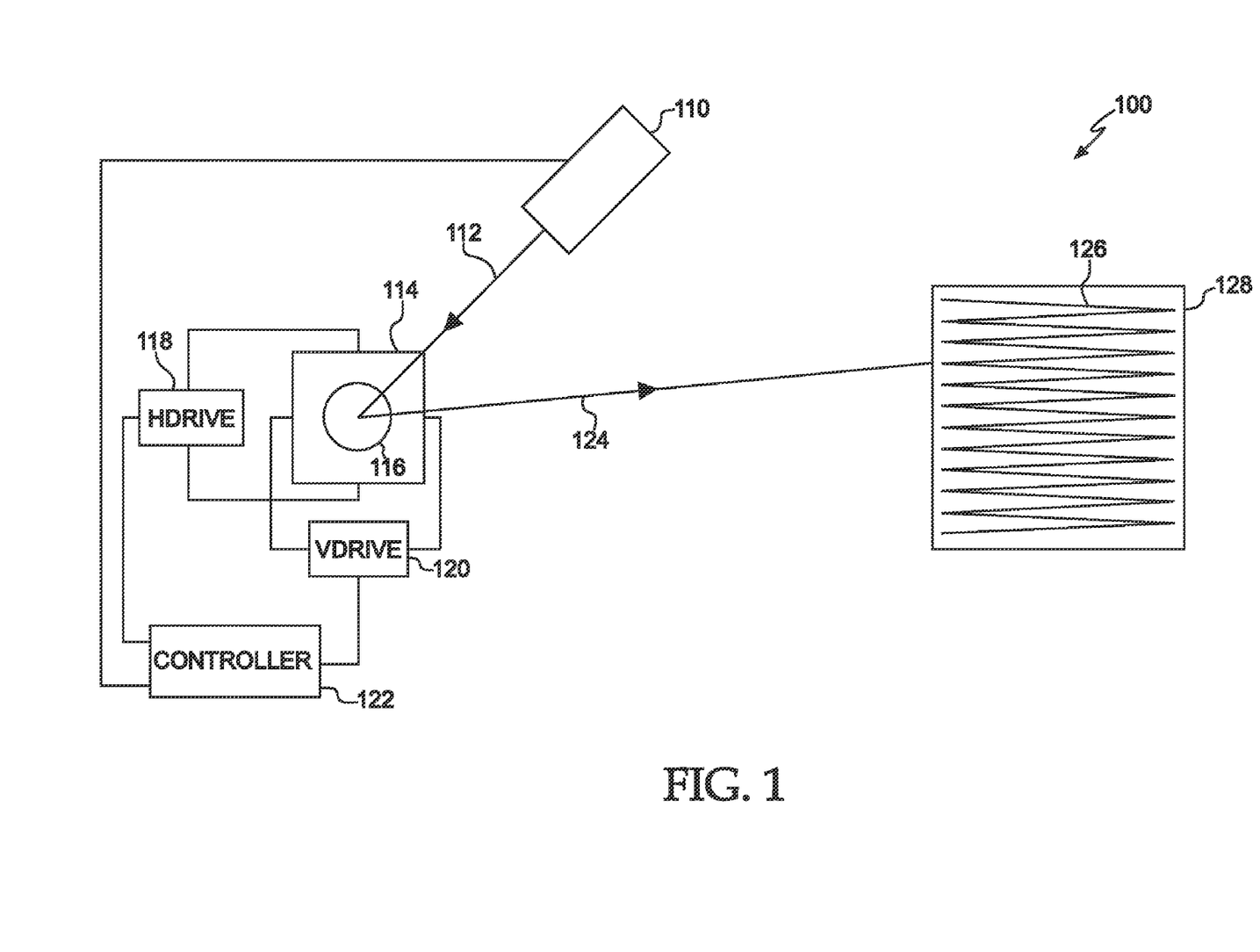
FIG. 1 is a diagram of a scanned beam display in accordance with one or more embodiments.

Referring now to FIG. 1, a diagram of a scanned beam display in accordance with one or more embodiments will be discussed. Although FIG. 1 illustrates a scanned beam display system for purposes of discussion, it should be noted that a scanned beam imaging system such as a bar code scanner could likewise be utilized in accordance with one or more embodiments, and the scope of the claimed subject matter is not limited in this respect. As shown in FIG. 1, scanned beam display 100 comprises a light source 110, which may be a laser light source such as a laser or the like, capable of emitting a beam 112 which may comprise a laser beam. The beam 112 impinges on a scanning platform 114 which may comprise a microelectromechanical system (MEMS) based scanner or the like, and reflects off of scanning mirror 116 to generate a controlled output beam 124. A horizontal drive circuit 118 and a vertical drive circuit 120 modulate the direction in which scanning mirror 116 is deflected to cause output beam 124 to generate a raster scan 126, thereby creating a displayed image 128, for example on a projection surface. A display controller 122 controls horizontal drive circuit 118 and vertical drive circuit 120 by converting pixel information of the displayed image into laser modulation synchronous to the scanning platform 114 to write the image information as displayed image 128 based upon the position of the output beam 124 in raster pattern 126 and the corresponding intensity and/or color information at the corresponding pixel in the image. Display controller 122 may also control other various functions of scanned beam display 100.

In one or more embodiments, a fast scan axis may refer to the horizontal direction of raster scan 126 and the slow scan axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 118. However, the scope of the claimed subject matter is not limited in these respects. An example arrangement of a comb-drive scanning platform 114 is discussed with respect to FIG. 2, below.

Figure 2:
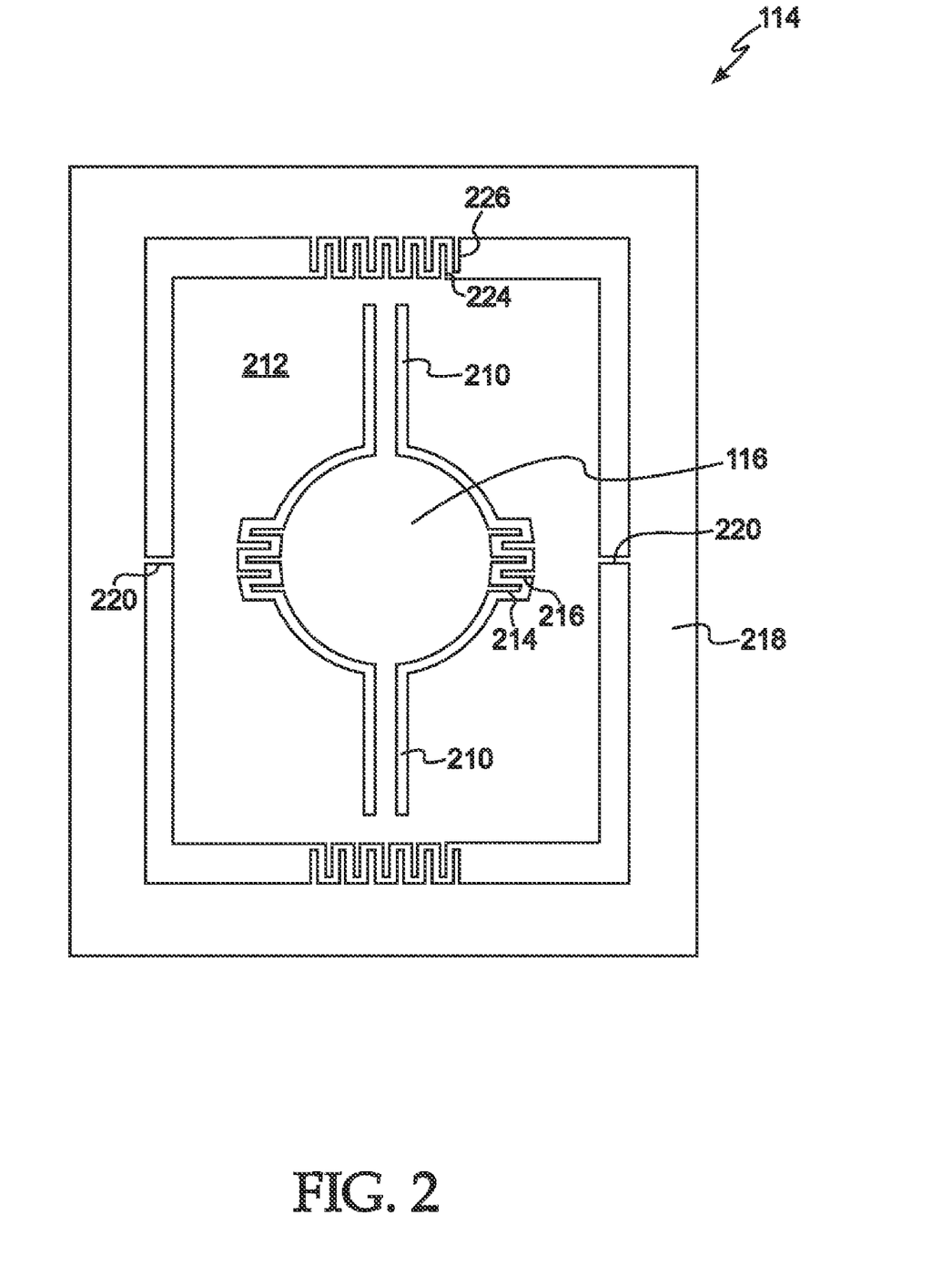
FIG. 2 is a diagram of a two axis comb drive scanning platform in accordance with one or more embodiments.

Referring now to FIG. 2, a diagram of a two axis comb drive scanning platform in accordance with one or more embodiments will be discussed. As shown in FIG. 2, scanning platform 114 comprises scanning mirror 116 suspended generally along a Y-axis by flexures 210 coupled to scanning body 212. Scanning mirror 116 and scanning body include interdigitated fast scan comb fingers 214 and 216, respectively being metalized or otherwise electrically conductive such that the fingers 214 and 216 may be charged with an appropriate drive signal to cause scanning mirror 116 to rotate about the Y-axis defined by flexures 210 via torsional deformation of the flexures. In one or more embodiments, scanning platform comprises silicon or the like such that scanning platform 114 may comprise a MEMS device using silicon fabrication technologies, although the scope of the claimed subject matter is not limited in this respect. Thus, in one or more embodiments, scanning mirror 116 may be designed to have a particular mass which in conjunction with the torsional characteristics of the material from which flexures are formed may result in a natural resonance characteristic of the rotational movement of scanning mirror 116 about the Y-axis defined by flexures 210. In one or more embodiments, the drive signal applied to comb fingers 214 and 216 may drive scanning mirror 116 at or near its designed natural resonant frequency, and in one or more alternative embodiments, the drive signal may drive scanning mirror 116 non-resonantly at a frequency other than the natural resonant frequency of scanning mirror 116, however the scope of the claimed subject matter is not limited in this respect.

In one or more embodiments, scanning body 212 may in turn be suspended within fixed frame 218, which in general may comprise a fixed body or other support body, by flexures 220 generally disposed along an X-axis. Likewise, scanning body 212 and fixed frame 218 include interdigitated slow scan comb fingers 224 and 226, respectively, which may also be metalized and driven with another drive signal to cause the entirety of scanning body 212 to oscillate about the X-axis defined by flexures 220 via torsional deformation of flexures 220. Thus, in one or more embodiments, a beam 112 of light such as a laser beam may be directed onto scanning mirror 116 and reflected off of scanning mirror 116 as output beam 124 in a raster scan 126 or similar pattern. In such an arrangement, fast scan comb fingers 214 and 216 may be driven with a horizontal drive signal received from horizontal drive circuit 118 to create a fast scan in a horizontal direction, and slow scan comb fingers 224 and 226 may be driven with a vertical drive signal received from vertical derive circuit 120 to create a slow scan in a vertical direction to generate an overall two-dimensional raster scan 126, although the scope of the claimed subject matter is not limited in these respects.

Figure 3:
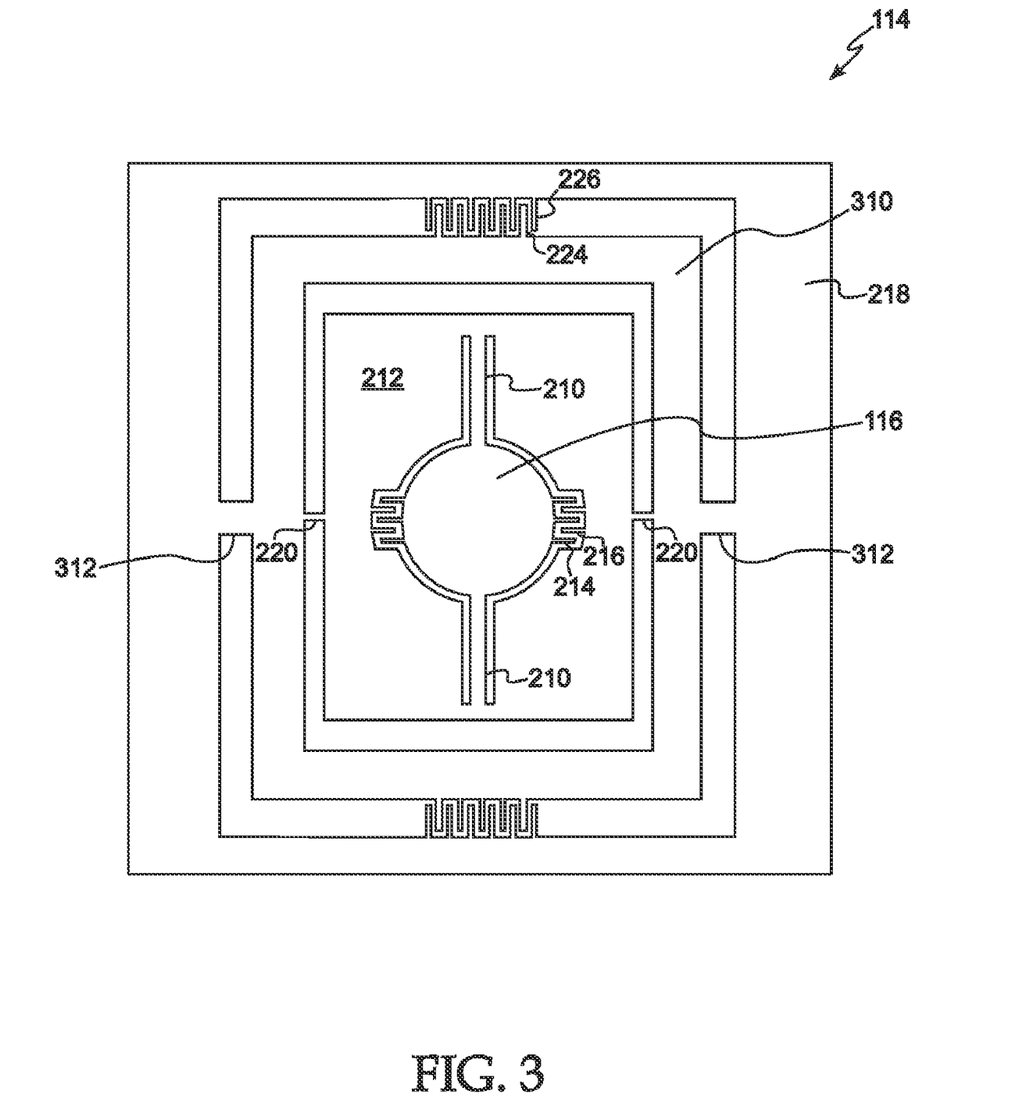
FIG. 3 is a block diagram of a three body, two-dimensional scanning platform wherein the third body comprises a slow scan drive frame in accordance with one or more embodiments.

Referring now to FIG. 3, a block diagram of a three body, two-dimensional scanning platform wherein the third body comprises a slow scan drive frame in accordance with one or more embodiments will be discussed. As shown in FIG. 3, scanning platform 114 of FIG. 3 is substantially similar to scanning platform 114 of FIG. 2, however scanning body 212 is coupled to fixed frame 218 via an interposing outer scanning body 310. Scanning body 212 is coupled to outer scanning body 310 via flexures 220, and outer scanning body 312 is coupled to fixed frame 218 via outer body flexures 312 that are generally disposed along an X-axis. Furthermore, slow scan comb fingers 224 are disposed on outer body 310 to electrostatically couple with slow scan comb fingers 226 of fixed frame 218. Thus, in the embodiment of scanning platform 114 as shown in FIG. 3, the entirety of outer body 310, scanning body 212 and scanning mirror 116 may oscillate about an X-axis defined by outer body flexures 312 when an appropriate slow scan drive signal is applied to slow scan comb fingers 224 and 226.

In one or more embodiments, the arrangement of scanning planning platform 114 as shown in FIG. 3 is capable of reducing and/or eliminating crashing of slow scan comb fingers 224 and 226 by eliminating the combs from scanning body 212. Instead, the slow scan achieved via torsional deformation of outer body flexures 312 that couple out scanning body 310 to fixed frame 218. In one or more embodiments, outer body flexures are sufficiently stiff to be able to resist motion in the presence of outside vibrations and/or accelerations that would otherwise tend to cause lateral motions causing comb fingers 224 and 226 to crash into each other. Outer body 310 may be driven by a torque $T_{drive}$ at 60 Hz via an appropriate comb drive circuit. In one or more embodiments, the dynamic system of scanning platform will have two natural modes of resonance. An equivalent spring-mass system of such a dynamic system is shown in and described with respect to FIG. 4, below.

Figure 4:
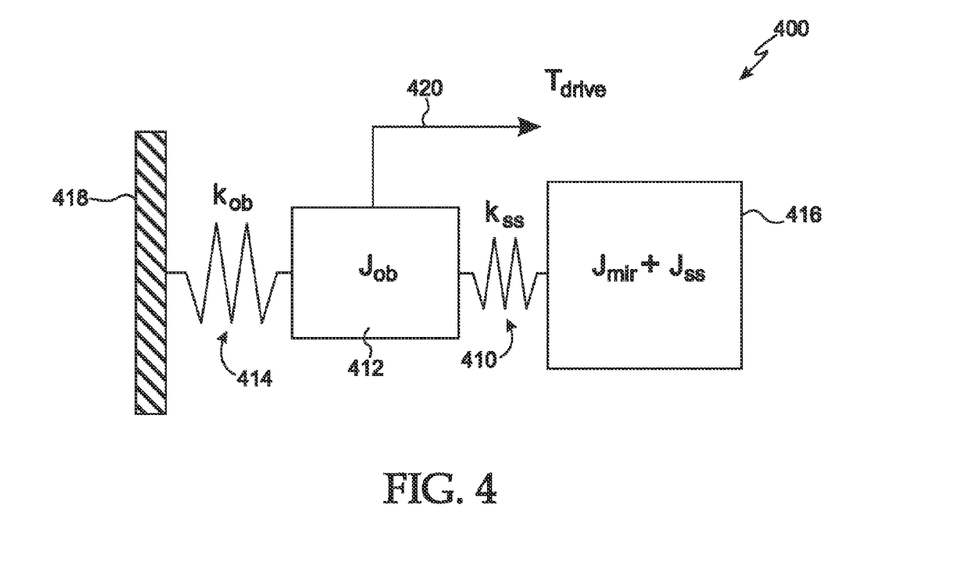
FIG. 4 is a diagram of a lumped parameter model of a slow scanning axis of a scanning platform in accordance with one or more embodiments.

Referring now to FIG. 4, a diagram of a lumped parameter model of a slow scanning axis of a scanning platform in accordance with one or more embodiments will be discussed. In one or more embodiments, lumped parameter model 400 may model the dynamic system of scanning platform 114 as shown in and described with respect to FIG. 3, however the scope of the claimed subject matter is not limited in this respect. In one or more embodiments, a practical design for scanning platform 114 would have a first natural mode at or near approximately 60 Hz which roughly corresponds to a frequency defined by spring ($k_{ss}$) 410, which is realized by flexures 220, and inertia ($J_{ob}$) 412, which is realized by outer body 310. The second natural mode would have a frequency somewhat higher so that the displacements to shock accelerations would not result in comb finger crashing. The frequency of this mode would roughly correspond to the frequency defined by spring ($k_{ob}$) 414, which is realized by outer body flexures 312 and inertia ($J_{ob}$) 412. Inertia ($J_{mir}+J_{ss}$) 416 is realized by the combined inertias of scanning mirror 116 and scanning body 212, respectively, and support surface 418 is realized by fixed frame 218. To make this frequency significantly higher than the 60 Hz mode and yet maintain a reasonably sized out body flexure 312 supporting the outer body 310, the inertia ($J_{ob}$) 412 should be minimized, or nearly minimized. In one or more embodiments, it may be ideal to have $J_{ob}<J_{ss}$ and $k_{ob}>k_{ss}$, although various other factors may affect what is capable of being practically implemented. One technique that may be utilized to obtaining such a modal frequency separation is shown and described with respect to FIG. 5, below.

Figure 5:
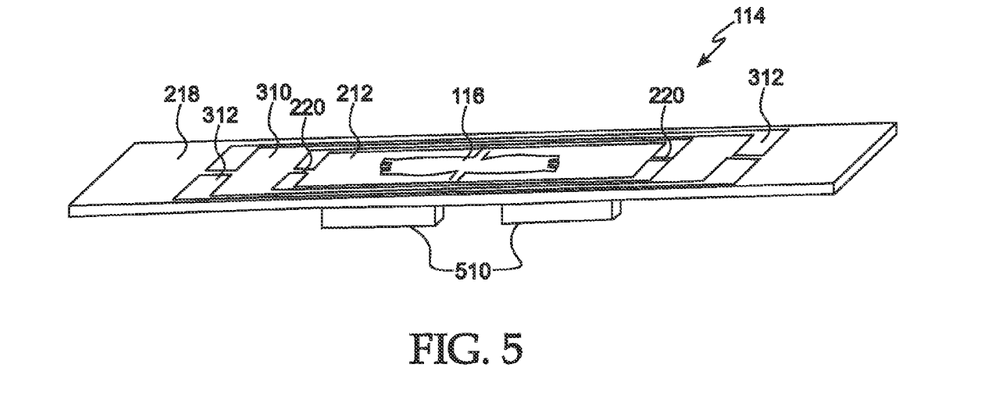
FIG. 5 is a diagram of a scanning platform having added mass to create a low frequency natural mode in accordance with one or more embodiments.

Referring now to FIG. 5, a diagram of a scanning platform having added mass to create a low frequency natural mode in accordance with one or more embodiments will be discussed. Scanning platform 114 is shown in FIG. 5 in a low profile isometric view. In one or more embodiments, added mass 520 may be disposed on the backside of scanning body 212 to help achieve the lower frequency 60 Hz mode without adding mass to outer scanning body 312. Such an arrangement may allow the torsional springs to remain at their original stiffness. However, the increased mass may result in increased force acting on the slow scanning body 212 in the presence of external vibrations and/or acceleration inputs, for example where scanning platform is deployed in portable devices such as cellular telephones which should be able to accommodate significant shock inputs from the user. However, this is merely one example arrangement for achieving a lower frequency 60 Hz mode, and the scope of the claimed subject matter is not limited in this respect.

Figure 6:
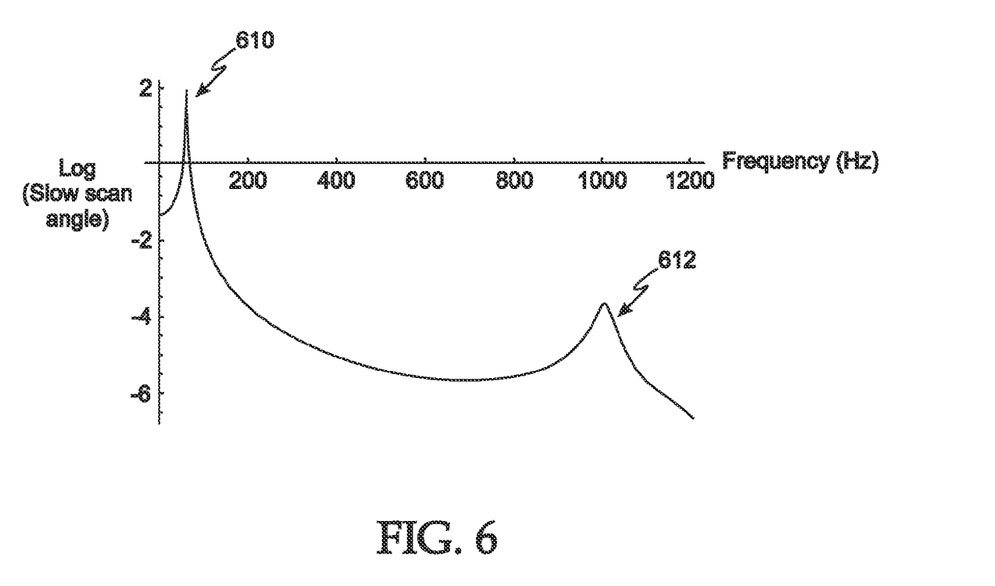
FIG. 6 is a log scale frequency response curve of a slow scan plate of a scanning platform in accordance with one or more embodiments.
Figure 7:
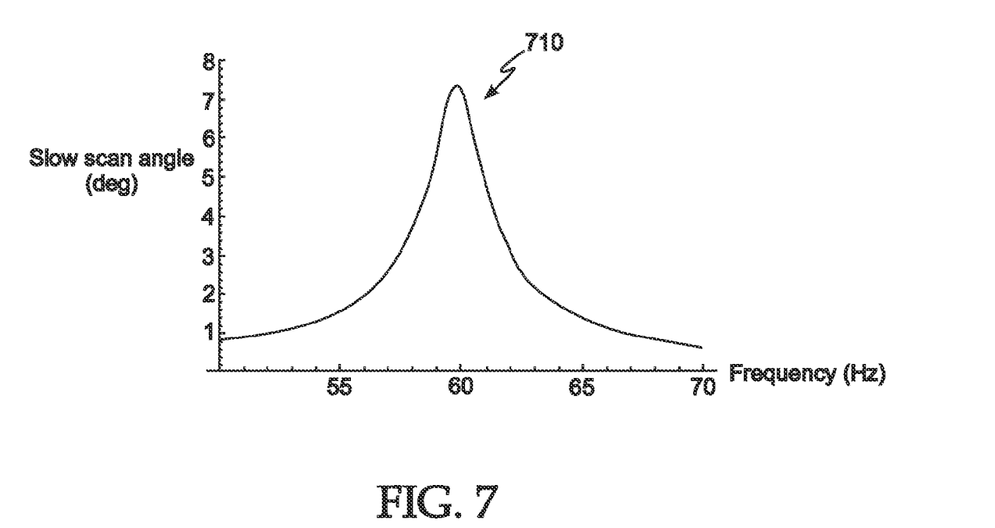
FIG. 7 is a linear scale plot of the frequency response of a slow scan plate of a scanning platform in accordance with one or more embodiments.
Figure 8:
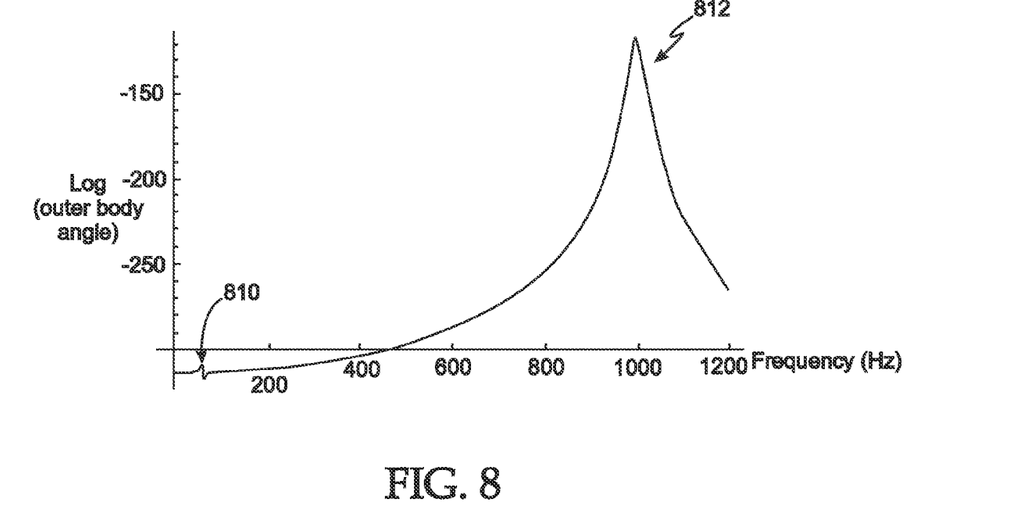
FIG. 8 is a log scale frequency response curve for the outer body tilt angle of a scanning platform in accordance with one or more embodiments.
Figure 9:
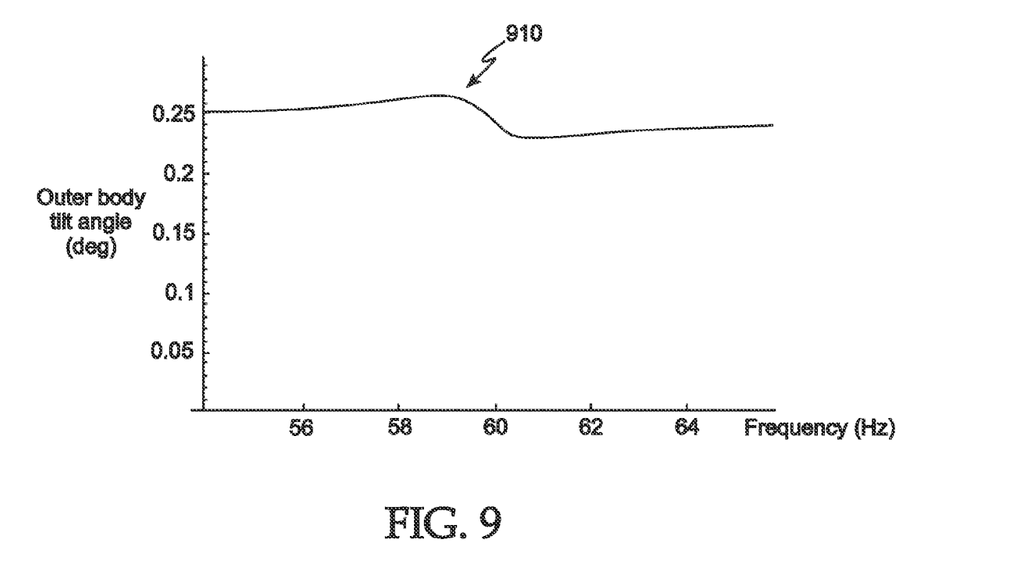
FIG. 9 is a linear scale plot of the frequency response for the outer body tilt angle of a scanning platform in accordance with one or more embodiments.

Referring now to FIG. 6, FIG. 7, FIG. 8, and FIG. 9, calculated frequency response curves for the dynamic system comprising out scanning body 310 and scanning plate 212 in accordance with one or more embodiments will be discussed. Parameters were chosen so that the two modes of the coupled oscillator were at about 60 Hz and 1.0 kHz with quality factors Q of about 30. FIG. 6 shows a logarithmic plot of the tilt angle of scanning body 212 in response to a periodic torque applied to outer scanning body 310. As can be seen in FIG. 6, a resonant peak 610 occurs at about 60 Hz for the slow scan mode, and another resonant peak 612 occurs at about 1 kHz. FIG. 7 shows the response around 60 Hz on a linear scale. As shown in FIG. 7, a resonant peak 710 occurs at a frequency of about 60 Hz for the slow scan which corresponds to a maximum amount of deflection of scanning body 212. FIG. 8 shows a logarithmic plot of the tilt angle frequency response of outer scanning body 310. As shown in FIG. 8, a slight resonant peak 810 occurs at about 60 Hz for the slow scan mode, and a much higher resonant peak 812 occurs at about 1 kHz. FIG. 9 shows the response around 60 Hz on a linear scale. The 60 Hz mode comprises oscillations of both scanning body 212 and outer scanning body 310, as shown at resonant peak 910, however the motion of outer scanning body 310 is relatively small, for example only about 0.25° for outer scanning body 310 compared to about 7.4° for the scanning body 212. The resonant response of scanning body 212 is approximately Q times the resonant response of outer scanning body 310.

Figure 10:
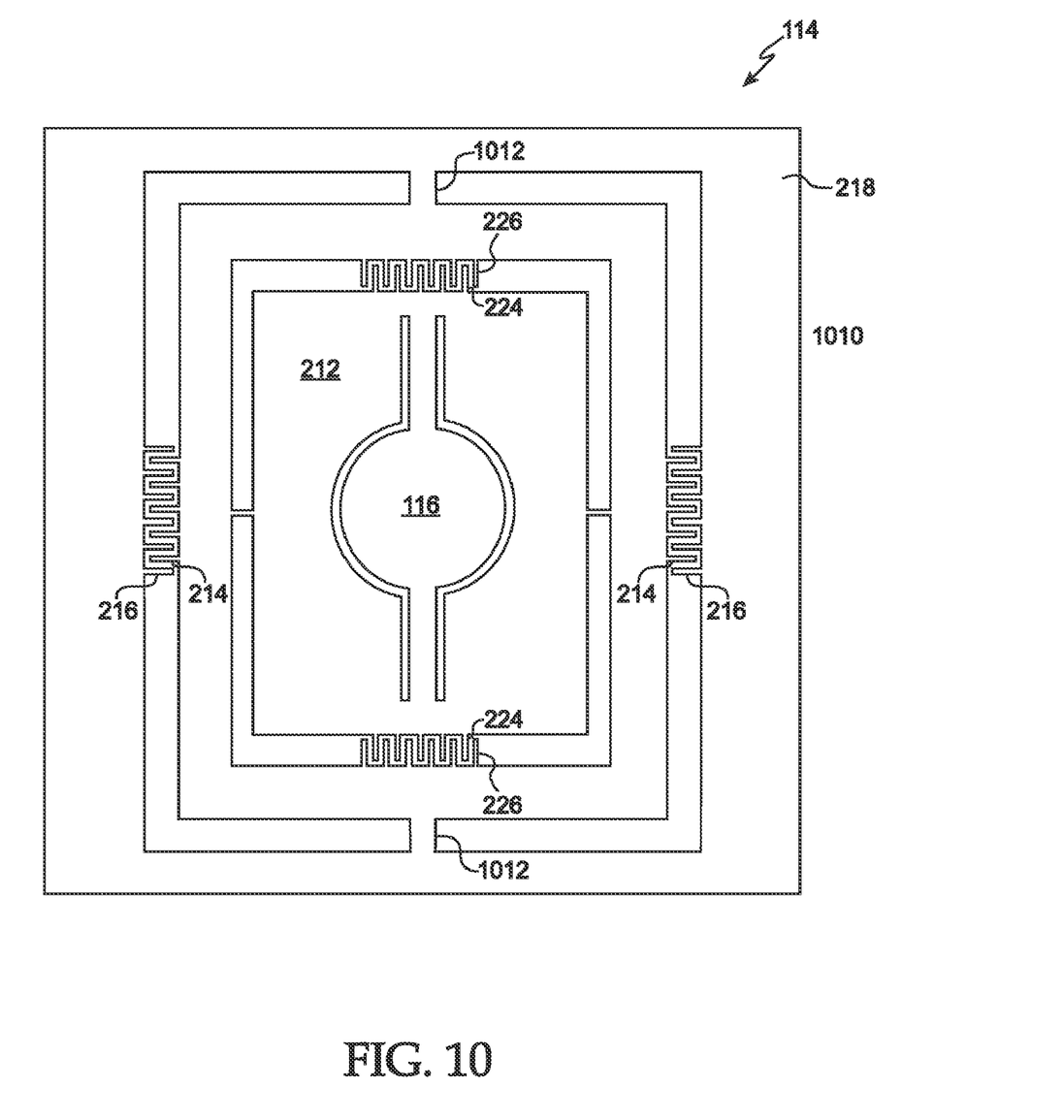
FIG. 10 is a diagram of a three body, two-dimensional scan plate of a scanning platform wherein the third body comprises a fast scan drive frame in accordance with one or more embodiments.

Referring now to FIG. 10, a diagram of a three body, two-dimensional scan plate of a scanning platform wherein the third body comprises a fast scan drive frame in accordance with one or more embodiments will be discussed. One possible solution to addressing damping energy loss in scanning platform 114 is to reduce the damping of the moving parts and to increase the efficiency of the conversion of an electrical signal to motion of scanning mirror 116. In the embodiment shown in FIG. 10, an additional oscillating frame, fast scan frame 1010, to excite the motion of scanning mirror 116. In one or more embodiments, fast scan comb fingers 214 and 216 are removed from scanning mirror 116, and as a result their contribution to the damping at scanning mirror 116 is eliminated and relocated to fast scan frame 1010 and fixed frame 218. In such an arrangement, comb fingers 214 and 216 may be patterned on the fast scan frame 1010 and fixed frame 218 to have a larger capacitance than when patterned on scanning mirror 116 and scanning body 212. As a result, the energy applied to oscillations in scanning platform at any given drive voltage is increased due to the larger capacitance of comb fingers 214 and 216 to provide a larger drive torque for the given drive voltage. In addition, since the comb fingers 214 and 216 are disposed at a greater distance from an axis defined by flexures 1012 of fast scan frame 1012, a greater drive torque may be obtained for a given drive voltage due to the increased torque obtained via the greater distance from the axis of rotation. However, any damping resulting from comb fingers 214 and 216 being disposed at a greater distance from the axis of rotation may also be increased. The added damping and/or added electrostatic drive torque follow similar scaling laws with the distance R from the axis of rotation that the additional moving material is disposed, both increasing with the square of the distance, $R^2$. In one or more embodiments, the geometry of comb fingers 214 and 216, and/or the resulting capacitance, are selected to result in a net reduction of damping for the fast scan mode, although the scope of the claimed subject matter is not limited in these respects. In one or more embodiments, the geometry of comb fingers 214 and 216, and/or the resulting capacitance, are selected to result in a net improvement in operational efficiency by increasing the amount of mechanical work done by a drive signal more than the damping energy losses are increased, although the scope of the claimed subject matter is not limited in these respects.

Figure 11:
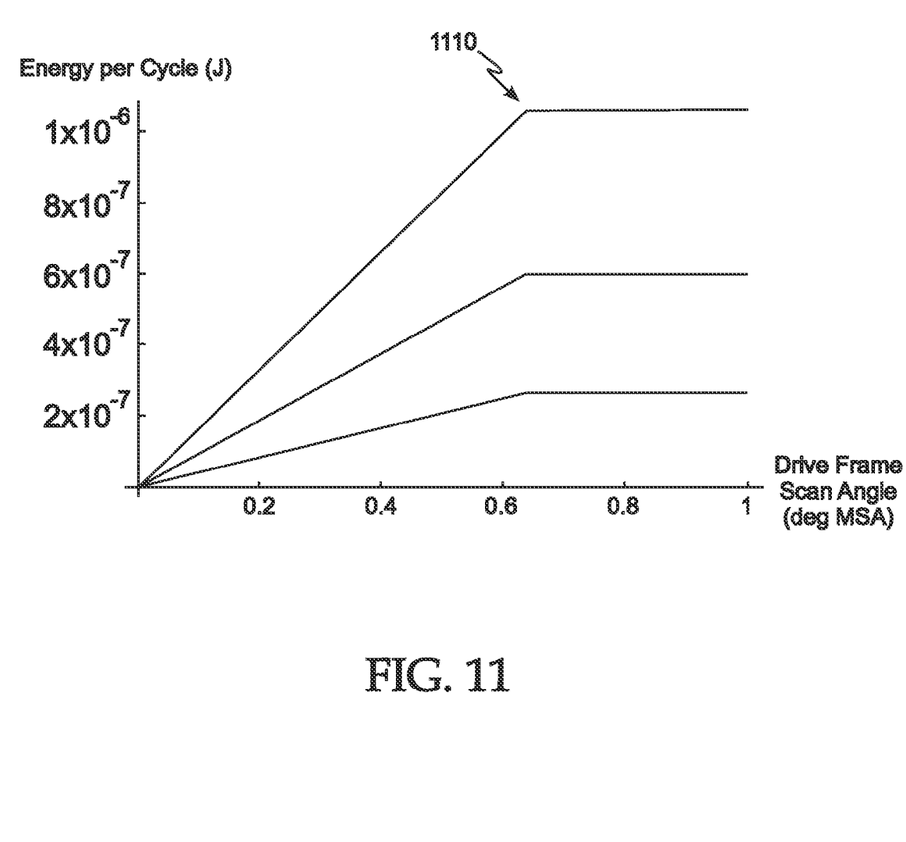
FIG. 11 is a plot of energy input per cycle for a fast scan drive frame of a scanning platform in accordance with one or more embodiments.

Referring now to FIG. 11, a plot of energy input per cycle for a fast scan drive frame of a scanning platform in accordance with one or more embodiments will be discussed. In one or more embodiments, comb fingers 214 may be disposed on fast scan frame 1010 at a distance of about 5 mm from the fast scan axis generally defined by flexures 1012, and comb fingers 214 are about 400 µm in dimension. The electrostatic energy input per cycle for various drive voltage levels is shown by the plots in FIG. 11. The comb fingers 214 on fast scan frame 1010 disengage from comb fingers 216 on fixed frame 218 at approximately a 0.6° mirror scan angle (MSA) as represented by the hard knees 1110 in the energy plots. The fast-scan drive frame scan motion requirement is approximately equal to the mirror scan angle divided by the quality factor of the mirror oscillator. For a scanning mirror 116 having a diameter of about 1 mm mirror without comb fingers as shown in the embodiment of FIG. 10, the quality factor computed from air drag damping losses is about 134 for a 10° MSA, and an estimate of the motion requirement for the fast scan frame 1010 is approximately 10°/134=0.07° MSA. However, this is merely one example arrangement of scanning platform 114 as shown in FIG. 10, and the scope of the claimed subject matter is not limited in these respects.

Figure 12:
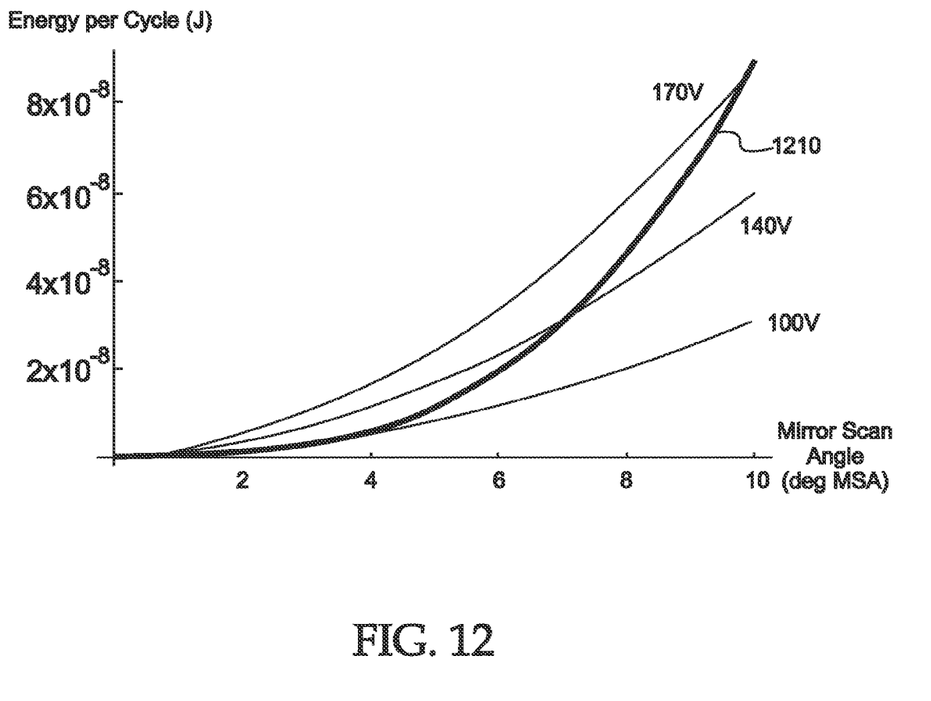
FIG. 12 is a plot of damping energy loss cycle versus scan angle and drive frame comb energy input per cycle versus scan angle for varying drive voltage of a scanning platform in accordance with one or more embodiments.

Referring now to FIG. 12, a plot of damping energy loss cycle versus scan angle and drive frame comb energy input per cycle versus scan angle for varying drive voltage of a scanning platform in accordance with one or more embodiments will be discussed. Damping energy loss per cycle is shown by plot 1210 and plotted against mirror scan angle, along with the energy input per cycle by the electrostatic actuator at different drive voltage levels. As shown in FIG. 12, with the damping for the fast scan frame 1010 and attached comb fingers 214 being added to the energy dissipation, the drive energy input matches damping dissipation at smaller drive voltage levels, for example 170 V for a 10° mirror scan angle (MSA) of scanning mirror 116, which is an decrease of over 100 V compared to the embodiment shown for example in FIG. 2. In other words the embodiment shown in FIG. 10, the same amount of mirror scan angle deflection may be obtained with a greatly reduced drive voltage, although the scope of the claimed subject matter is not limited in this respect.

Figure 13:
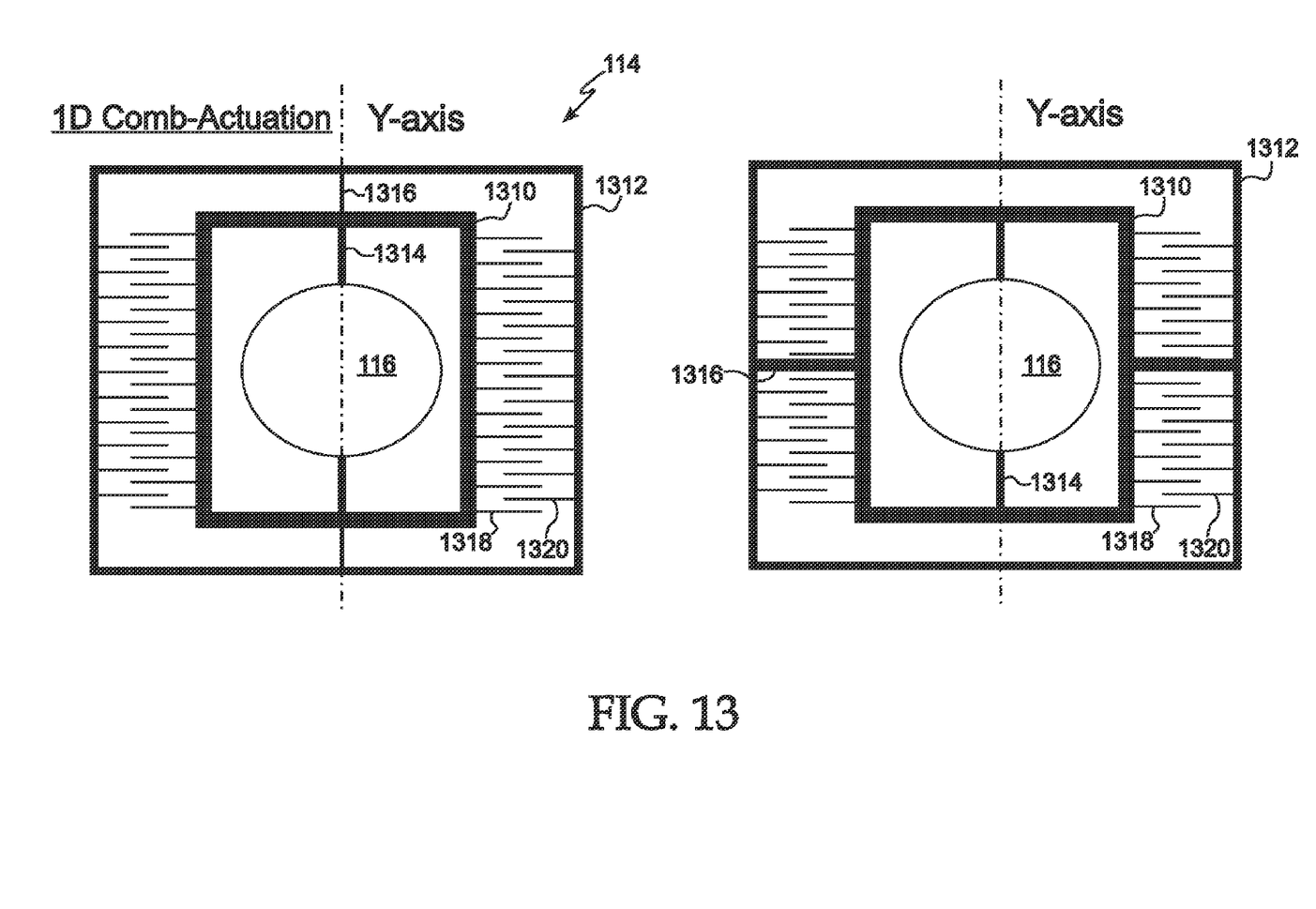
FIG. 13 is a diagram of a one-dimensional comb actuation scanning frame showing an outer frame capable of operating in a rocking mode rotating about a Y-axis or an X-axis in accordance with one or more embodiments.

Referring now to FIG. 13, a diagram of a one-dimensional comb actuation scanning frame showing an outer frame capable of operating in a rocking mode rotating about a Y-axis or an X-axis in accordance with one or more embodiments will be discussed. In general, in one or more embodiments, lower damping for scanning platform 114 can be achieved if the comb fingers 1318 and 1320 are utilized to actuate an outer frame 1310 with respect to fixed frame 1312 and the resultant drive torque is coupled to an inner frame comprising scanning mirror 116 via mechanical coupling. Outer frame 1310 may rotate about the Y-axis via torsional distortion of flexures 1316, and scanning mirror 116 is caused to rotate about the Y-axis since outer frame 1314 is mechanically coupled to scanning mirror 116 via flexures 1314. If outer frame 1310 is energized at the resonant frequency of the inner frame, which in FIG. 13 is the resonant frequency of scanning mirror 116 oscillating via torsion of flexures 1314, the motion of scanning mirror 116 gets amplified by the quality factor Q of scanning mirror 116. Since there are no comb fingers and/or any electrical input to scanning mirror 116, the damping of scanning mirror 116 will be lower and the resultant quality factor will be higher, although the scope of the claimed subject matter is not limited in this respect.

Figure 14:
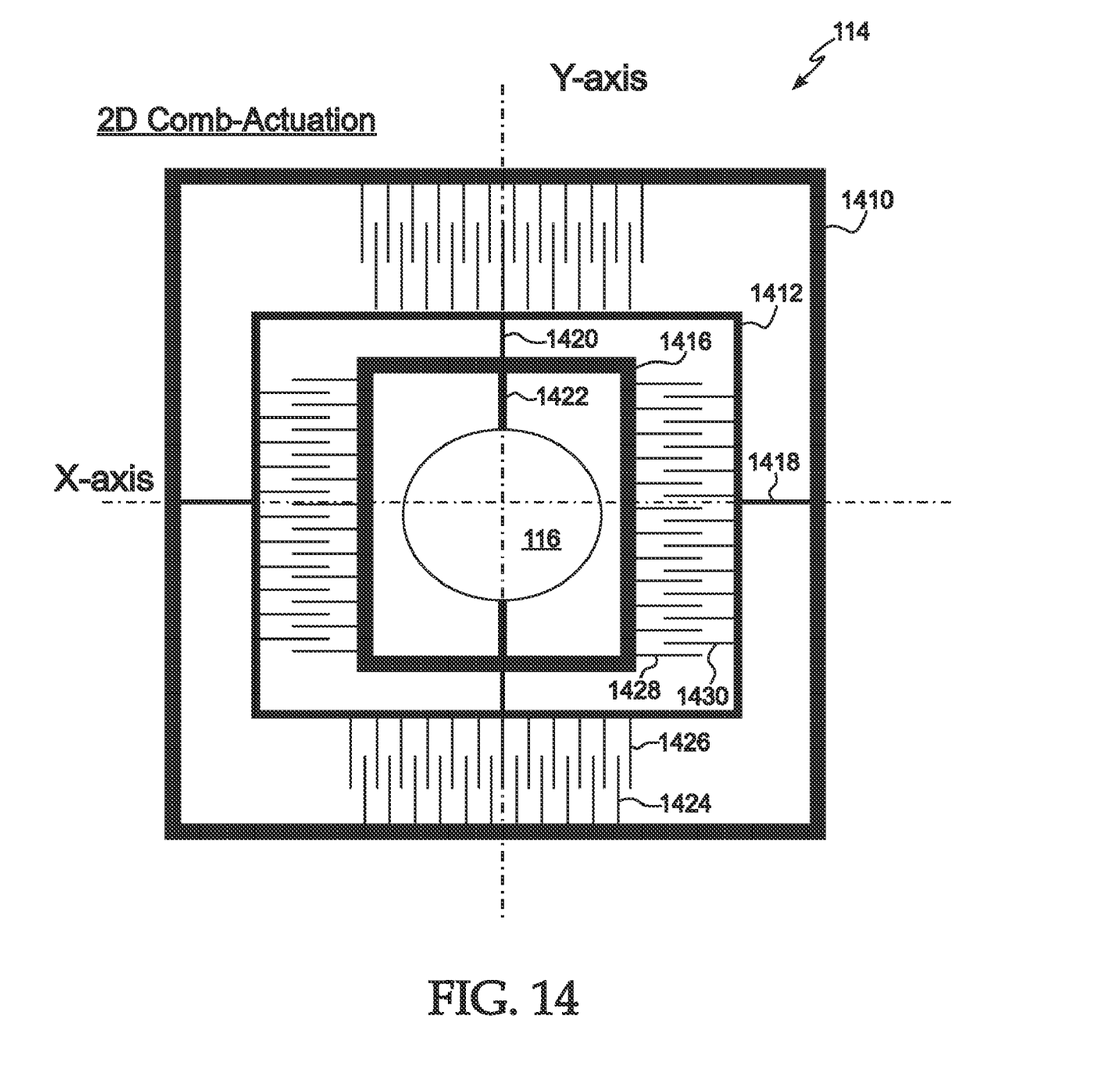
FIG. 14 is a diagram of a three body, two-dimensional comb actuation scanning frame in accordance with one or more embodiments.

Referring now to FIG. 14, a diagram of a three body, two-dimensional comb actuation scanning frame in accordance with one or more embodiments will be discussed. In the embodiment of scanning platform 114 as shown in FIG. 14, FIG. 2 the inner frame comprising scanning mirror 116 resonates at a higher frequency to provide a fast scan mode and outer frame 1418 resonates at a lower frequency to provide a slow scan mode. Due to the nonlinear nature of the frequency response, the range of frequencies where comb drive actuation of scanning platform can operate may be limited. Thus, the resonant frequencies of scanning mirror 116 may be in the range of operation for outer frame 1412. In one or more alternative embodiments, comb fingers 1424 and 1426 and/or comb fingers 1428 and 1430 may be fabricated so that there is an offset in the height of the comb fingers. In one or more embodiments, fabricating such offset height comb fingers may involve an additional mask in the process, however the resulting arrangement of the comb fingers may allow operation of scanning platform at any frequency including direct current (DC). Thus, in one or more embodiments, a fast scan drive voltage may be applied to comb fingers 1428 and 1430 to cause frame 1416 to rotate about the Y-axis with respect to frame 1412 via torsion of flexures 1420. Frame 1416 is mechanically coupled to scanning mirror 116 via flexures 1422 which thereby causes scanning mirror 116 to oscillate resonantly about the Y-axis for the fast scan mode. Likewise, a slow scan drive voltage may be applied to comb fingers 1424 and 1426 to cause frame 1412 to rotate about the X-axis via torsion of flexures 1418 for the slow scan mode. However, this is merely one example of a two-dimensional scanning platform having lower damping, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to an induced resonance comb drive scanner and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A scanning platform, comprising:
   a scanning mirror disposed in a scanning body via a mirror flexure; and
   an outer frame supporting the scanning body and the scanning mirror via a first flexure, the outer frame being supported in a fixed body via a second flexure, the scanning body and the outer frame having a first set of comb fingers disposed thereon to cause the scanning body to oscillate about a first axis via torsion or other deflection of the first flexure in response to a first drive voltage applied to the first set of comb fingers, and the outer frame and the fixed body having a second set of comb fingers disposed thereon to cause the outer frame to oscillate about a second axis via torsion or other deflection of the second flexure in response to a second drive voltage applied to the second set of comb fingers;
   wherein the scanning mirror oscillates about the first axis via oscillation of the scanning body, and the scanning mirror oscillates about the second axis via oscillation of the outer frame that excites resonant motion of the scanning mirror about the mirror flexure via mechanical coupling of the scanning mirror with outer frame to result in a two-dimensional scanning pattern resulting from the first drive voltage and the second drive voltage.

2. A scanning platform as claimed in claim 1, wherein the scanning mirror is supported by the scanning body via a third flexure.

3. A scanning platform as claimed in claim 1, wherein the second set of comb fingers has an increased capacitance than would otherwise occur if the comb fingers were disposed on the scanning mirror to result in a greater drive energy for the oscillation of the outer frame for a given level of the second drive voltage.

4. A scanning platform as claimed in claim 1, wherein the second set of comb fingers at the outer frame results in a greater mirror scan angle than would otherwise occur if the comb fingers were disposed on the scanning mirror for a given level of the second drive voltage due to an increased amount of torque applied to the outer frame.

5. A scanning platform as claimed in claim 1, wherein an amount of work done by the second set of comb fingers or the damping from the second set of comb fingers, or combinations thereof, results in an increase in efficiency of scanning than if the second set of comb fingers were disposed on the scanning mirror.

6. A scanning platform as claimed in claim 1, wherein the scanning body oscillates at a frequency of about 60 Hz, and the outer frame oscillates at a frequency of about 32 kHz.

7. A scanning platform as claimed in claim 1, wherein the first flexure or the second flexure, or combinations thereof, comprise two or more flexures.

8. A method for driving a scanning platform, comprising:
   driving a first frame of the scanning platform directly by applying a drive voltage to a set of comb fingers disposed on the first frame to cause the first frame to oscillate via torsional rotation of a first flexure; and
   driving a second frame of the scanning platform indirectly via mechanical coupling of the second frame with the first frame via a second flexure to excite resonant motion of the second frame;
   wherein an amount of work done by the set of comb fingers or the damping of the second frame by the set of comb fingers, or combinations thereof, results in an increase in efficiency of scanning than if the set of comb fingers were disposed on the second frame and directly driven by the drive voltage.

9. A method as claimed in claim 8, said driving a first frame comprises driving the first frame is driven at or near a resonant frequency of oscillation of the second frame.

10. A method as claimed in claim 8, wherein the second frame has a resonant frequency of oscillation in a range of operation of the first frame.

11. A method as claimed in claim 8, wherein the quality factor of oscillation of the second frame is higher than if the set of comb fingers were disposed on the second frame and directly driven by the drive voltage.

12. A MEMS scanning system, comprising:
   a light source capable of emitting a beam of light;
   a MEMS scanning platform; and
   a controller to control the light source to impinge on the MEMS scanning platform, the MEMS scanning platform, the MEMS scanning platform comprising:
      a scanning mirror disposed in a scanning body via a mirror flexure; and
      an outer frame supporting the scanning body and the scanning mirror via a first flexure, the outer frame being supported in a fixed body via a second flexure, the scanning body and the outer frame having a first set of comb fingers disposed thereon to cause the scanning body to oscillate about a first axis via torsion of the first flexure in response to a first drive voltage applied to the first set of comb fingers, and the outer frame and the fixed body having a second set of comb fingers disposed thereon to cause the outer frame to oscillate about a second axis via torsion of the second flexure in response to a second drive voltage applied to the second set of comb fingers;
   wherein the scanning mirror oscillates about the first axis via oscillation of the scanning body, and the scanning mirror oscillates about the second axis via oscillation of the outer frame that excites resonant motion of the scanning mirror about the mirror flexure via mechanical coupling of the scanning mirror with outer frame to result in a two-dimensional scanning pattern resulting from the first drive voltage and the second drive voltage.

13. A MEMS scanning system as claimed in claim 12, wherein the scanning mirror is supported by the scanning body via a third flexure.

14. A MEMS scanning system as claimed in claim 12, wherein the second set of comb fingers has an increased capacitance to result in a greater drive energy for the oscillation of the outer frame for a given level of the second drive voltage.

15. A MEMS scanning system as claimed in claim 12, wherein the second set of comb fingers at the outer frame results in a greater mirror scan angle for a given level of the second drive voltage due to an increased amount of torque applied to the outer frame.

16. A MEMS scanning system as claimed in claim 12, wherein an amount of work done by the second set of comb fingers or the damping from the second set of comb fingers, or combinations thereof, results in an increase in efficiency of scanning than if the second set of comb fingers were disposed on the scanning mirror.

17. A scanning platform, comprising:
   an outer frame and an inner frame coupled to the outer frame via a flexure, the outer frame and the inner frame having a set of comb fingers capable of driving the inner frame with respect to the outer frame if a drive voltage is applied to the set of comb fingers; and
   a scanning mirror coupled to the inner frame via a mirror flexure;
   wherein the scanning mirror is capable of being caused to oscillate in response to the drive voltage via mechanical coupling of the scanning mirror with the inner frame that excites resonant motion of the scanning mirror about the mirror flexure.

18. A scanning platform as claimed in claim 17, wherein the outer frame is coupled to the inner frame via a torsional flexure.

19. A scanning platform as claimed in claim 17, wherein the scanning mirror mechanically coupled to the inner frame via a torsional flexure.

20. A scanning platform as claimed in claim 17, wherein an amount of work done by the set of comb fingers or the damping of the inner frame by the set of comb fingers, or combinations thereof, results in an increase in efficiency of scanning than if the set of comb fingers were disposed on the scanning mirror and directly driven by the drive voltage.

21. A scanning platform as claimed in claim 17, wherein the inner frame driven at or near a resonant frequency of oscillation of the scanning mirror.

22. A scanning platform as claimed in claim 17, wherein the scanning mirror has a resonant frequency of oscillation in a range of operation of the inner frame.

23. A scanning platform as claimed in claim 17, wherein the quality factor of oscillation of the scanning mirror via indirectly driving the scanning mirror by directly driving the inner frame is higher than if the set of comb fingers were disposed on the scanning and directly driven by the drive voltage.

24. A scanning platform as claimed in claim 17, wherein the comb fingers disposed on the outer frame at least partially lie outside of a plane in which the comb finger disposed on the inner frame lie.

* * * * *